Patented July 29, 1941

2,250,789

UNITED STATES PATENT OFFICE 2,250,789

CHROMIC OXIDE PIGMENTS

Joseph W. Ayers, Easton, Pa., assignor to C. K. Williams & Co., a corporation of Pennsylvania No Drawing. Application November 18, 1940, Serial No. 366,145

18 Claims. (Cl. 23—145)

This invention relates to processes of producing green chromic oxide pigments.

It is already known that chromic oxide can be obtained by heating such substances as chromic acid and ammonium dichromate to redness, but the products obtained in this way are light green in color, are dull and milky and lack color purity; hence they are of little or no commercial value for use in the pigment field. It is also known that chromic oxide may be produced by fusing or melting together various chromate salts with such substances as boric acid.

An object of the present invention is to provide a commercially operable process capable of producing clear and bright chromic oxide pigments, and in particular, green pigments of darker shades than heretofore obtainable by similar prior art processes. A specific object is to provide suitable chromic oxide pigments of very dark green color having good covering power, for use in the granules field.

In accordance with a preferred embodiment of the present invention, the process is carried out by intimately mixing together anhydrous chromic acid with about 2% to 5% of sodium carbonate, by weight, heating the mixture at a temperature of 1900°–1950° F. for a period of about 90 minutes, cooling the product, grinding the same to produce a mass of substantially uniform particle size, washing the mass with water thereby removing the sodium chromate formed and drying to produce a clear, bright chromic oxide pigment of very dark green color.

Anhydrous chromic acid having the formula $CrO_3$ is preferably employed for reasons of economy, but other chromic acid compounds may alternatively be used, namely, hydrated or liquid chromic acid ($H_2CrO_4$). If the hydrated material is employed, the water of hydration is expelled during calcination. Although dry mixing provides greater economy in operation, wet mixing in water solution may be used within the broader scope of the instant invention. Conventional wet mixing methods may be employed, using substantially any amount of water, preferably not more than 25% based on the chromic oxide. Before the calcination step is effected, the free water, or most of it, may be evaporated from the resulting reddish-brown solution at a temperature of 110° C. The mass should be dried to a point which will permit ready handling in the particular firing or calcining apparatus employed.

In its broader aspects, the invention is not limited to the specific salt mentiond, sodium carbonate, or to the conditions given, for other compounds and other treatments as hereinafter described provided pigments of the same quality or of almost equally good properties.

Instead of sodium carbonate, other compounds may be used, such compounds broadly comprising those which are adapted to react with chromic acid under the conditions of treatment to form soluble chromates. The neutral carbonates as well as the acid carbonates of the alkali metals give especially satisfactory results. Other suitable salts include the acid and neutral sulfate salts, the chlorate, borate, chloride and chromate salts of the alkali metals and other metals which upon heating yield soluble chromates during the subsequent calcination in the presence of the chromic acid. The hydroxides of the alkali metals also yield pigments of excellent quality, and are included within the scope of the present invention.

The proportion of the above mentioned salts or hydroxides used in the process of the present invention may be varied within wide limits. Any appreciable amount of the salts has the effect of producing clearer colors and darker shades than are obtainable by calcination without the addition of such compounds. However, the minimum of about 2% of the salt or other compound is preferable where the highest grade of dark green pigment is desired. Amounts above about 5% do not in general have any increased beneficial influence on the pigment. Since the soluble chromate formed in the operation of the present process by reaction with the salt or other compound is removed by washing, it is desirable for economic reasons to use as small a quantity of the salt or other compound as will effect the production of the chromic oxide of the desired dark green shade.

Although a temperature of about 1900° C. is preferred, other temperatures may be used with satisfactory results. The range of from 1600° to 2200° F. will generally give good high grade pigments of dark green color. Temperatures as low as 1400° F. can be used to produce clear and bright pigments, but the color is considerably lighter than that producible at the higher temperatures. Temperatures as high as 2400° F. may be employed but experience shows little or no advantage in temperatures of this magnitude.

The calcining operation may be satisfactorily effected in a period of about 90 minutes but periods of a longer or shorter time also give good results. If shorter periods are employed the color of the pigment obtained is of a comparatively light shade. Periods longer than 90 minutes, such as three or four hours, generally have little or no additional beneficial effect. In commercial operation of the instant process economy requires that the minimum period of treatment be used which will lead to the production of pigments of the desired quality.

In preparing the mixture of the chromic acid with the salt or other compound, any type of mixing apparatus may be used. Where dark green pigments are desired, a thorough or intimate mixing operation gives best results. Such may be accomplished satisfactorily by pulverizing the two in an apparatus of the mortar type or by grinding the same in a ball mill. If the mixture is made by simply stirring the compounds together without grinding, the pigment obtained is of a light shade.

Best results in producing dark green pigments can be had only if the heating operation in the furnace is uniform in character. Due to the slow rate of heat transfer of the mixture being treated, the mass should be roasted in comparatively shallow layers, furnaces of the pan muffle type being preferred. For the production of darker shades, a rapid heating operation is required in raising the temperature of the chromic acid and salt mixture to that to be maintained for the hereinbefore mentioned period. Rapid heating is accomplished by preheating the furnace to the desired temperature and then introducing the mixture of the chromic acid with the salt or other compound. If the mixture is heated at a temperature of about 1200° F. or somewhat lower for a period of about an hour prior to the heat treatment at the more elevated temperature in order to prevent dust loss, the pigment obtained is generally of a lighter shade than that obtainable without such preliminary heat treatment.

Upon completion of the heat treatment, the calcined mass is cooled and ground in any suitable way such as in a ball mill with water for a period of from two to three hours. Then the mass is washed free of the soluble salts present and is finally filtered and dried. The grinding operation is employed to break up the aggregated masses or clusters and to reduce the chromic oxide to a substantially uniform particle size. Extensive grinding operations may be used to increase the tinting strength by about 10%, but such treatment sacrifices depth of color and results in pigments of lighter shades which in some instances are slightly milky. For most purposes this loss of quality of color is insufficient to balance the increased strength and does not warrant the increased grinding.

Specific methods of carrying out the present invention are illustrated in the following examples wherein all parts are given by weight.

*Example 1*

One hundred parts of anhydrous chromic acid of technical grade are mixed with 3 parts of sodium carbonate by pulverizing in a ball mill. The resulting intimate mixture is then introduced into a pan muffle furnace theretofore heated to a temperature of 1950° F. Such heating conditions are maintained for a period of 90 minutes. The calcined material is removed, cooled and ground with water in a ball mill for about two hours. Next it is washed free of salts, filtered and dried. The product obtained is a clear chromic oxide pigment of dark green color.

A batch was run with the same raw materials under the same conditions as described above except that the materials were merely stirred together. A final pigment was obtained which was very light as compared with the previous batch.

When another batch was run using 6 parts of sodium carbonate instead of 3 parts and the mixture pulverized before calcining, a pigment was obtained of substantially the same dark green shade. When one part of the same salt was used the pigment obtained was of a comparatively light shade.

*Example 2*

A mixture of 100 parts of anhydrous chromic acid with 6.8 parts of sodium chromate of the formula $Na_2CrO_4.4H_2O$ is formed by pulverizing the two together. The mixture is then introduced into a furnace, heated to 1950° F. and maintained at this temperature for a period of 90 minutes. The charge is then removed, cooled, ground in a ball mill, washed and dried. An excellent chromic oxide pigment is obtained having a slightly darker color than that produced by the process of Example 1.

*Example 3*

A mixture is formed by grinding together 100 parts of anhydrous chromic acid with 3 parts of sodium hydroxide. This mixture is then heated to a temperature of 1950° F. and is maintained at this temperature for a period of 90 minutes. The calcined product, after removal and cooling, is ground, washed and dried. A good pigment of dark green color is obtained.

*Example 4*

A mixture is formed by grinding together 100 parts of anhydrous chromic acid and 3 parts of sodium chloride. This mixture is then calcined at a temperature of 1950° F. for a period of about 90 minutes. The charge is then withdrawn, cooled, ground to a product of uniform particle size, washed and dried. The pigment obtained is of excellent quality and of a dark green shade.

Substantially identical results in the foregoing process are obtained if potassium chloride is substituted in equal amount for the sodium chloride.

*Example 5*

100 parts of anhydrous chromic acid are mixed with 3 parts of sodium borate of the formula $Na_2B_4O_7.10H_2O$ by pulverizing together in a mortar. This mixture is then introduced into a pan muffle furnace heated to a temperature of 1900° F. A heat treatment is effected by maintaining this temperature in the mass for a period of three hours. The calcined material is then removed, cooled, ground in a ball mill, washed to remove soluble salts, filtered and dried. The chromic oxide pigment obtained is a dark green color but is of a slightly lighter shade than the pigment obtained by the process of Example 1.

*Example 6*

A mixture is formed of 100 parts of anhydrous chromic acid and 3 parts of sodium carbonate. A third of it is heated to 1800° F., a third to 1600° F. and a third to 1400° F., each of the portions being maintained at the specified temperatures for a period of 90 minutes. Each of these three batches is then cooled, ground, washed and dried. The pigment obtained in each case is clear and bright but is considerably lighter in shade than that obtained by the process of Example 1. The portion heat treated at 1400° is the lightest in color, whereas the portion heated at 1800° is the darkest of the three batches.

From the description hereinbefore given and the above examples it is evident that the instant invention in its broadest aspects may be described as a process adapted to produce chromic oxide pigments by a series of steps which includes calcining chromic acid together with a salt or other compound adapted to form a soluble chromate during subsequent heat treatment, then heating the mixture to a temperature which forms the soluble chromate and reduces the acid to chromic oxide, next continuing the heat operation until a clear green color is obtainable on cooling and washing, then removing the heat treated mass, grinding, washing out the soluble chromate formed during the heating operation and finally drying to obtain a chromic oxide pigment in powder form.

The chromic oxide pigments produced by the process of the present invention and in particular those of dark green color, have an almost universal use in the granules field, for they may be used in all of the conventional types of binders now employed to cement pigments on the surfaces of the granules, such binders being, for example, sodium silicate, oxychloride and phosphate cements and high temperature frits. Furthermore, the pigments may be applied to any of the conventional granules including fused clay granules. Depending upon the intensity of the color desired by the manufacturer, the amount of pigment used may vary from twelve to twenty-five pounds per ton of granules. For example, 22 pounds of the dark green pigment applied to a ton of granules results in a very desirable product. The darker, as well as the lighter shades of pigments described herein are suitable for wide application in many arts, for example, in paints, lacquers, enamels, plastics, linoleum and rubber.

This application is a continuation in part of application Serial No. 188,457, filed February 3, 1938.

It shall be understood that the present invention is not limited to the specific processes and products set out above but that it extends to all equivalent materials and conditions within the scope of the claims appended hereto.

I claim:

1. The process of producing chromic oxide pigments which comprises mixing together anhydrous chromic acid and a small percentage of a compound which will react with chromic acid at least in part on heating to form a soluble chromate, heating the mixture to a temperature between 1400° F. to 2400° F. which forms the soluble chromate and reduces the acid to chromic oxide, continuing the heating until a clear green color is obtainable on cooling and washing, then cooling, washing out the soluble chromate formed and drying.

2. The process of producing chromic oxide pigments which comprises adding to anhydrous chromic acid a small percentage of a salt compound which will react with chromic acid at least in part on heating to form a soluble chromate, intimately mixing the two together, calcining the mixture at a temperature of from 1400° F. to 2400° F. until a clear green color is obtainable on cooling and washing, then cooling, washing out the soluble chromate formed and drying.

3. The process of producing chromic oxide pigments which comprises mixing together in a substantially anhydrous state anhydrous chromic acid and a small percentage of a compound which will react with chromic acid at least in part on heating to form a soluble chromate, heating the mixture to a temperature of from 1600° F. to 2200° F. for a period of at least about one hour, then cooling, washing out the soluble chromate formed and drying, thereby producing a product which when ground comprises a clear dark green pigment.

4. The process of producing chromic oxide pigments which comprises intimately mixing together anhydrous chromic acid and a small percentage of a carbonate of a metal which will react with chromic acid at least in part on heating to form a soluble chromate, heating the mixture at a temperature of from 1400° F. to 2400° F. until a clear green color is obtainable on cooling and washing, then cooling, washing out the soluble chromate formed and drying.

5. The process of producing chromic oxide pigments which comprises intimately mixing together anhydrous chromic acid and a small percentage of a carbonate of an alkali metal, calcining the mixture at a temperature of from 1600° F. to 2200° F. for a period of at least about one hour, then cooling, washing out the soluble chromate formed and drying, thereby producing a clear dark green pigment.

6. The process of producing chromic oxide pigments which comprises intimately mixing together anhydrous chromic acid and a small percentage of sodium carbonate but not less than about 2% of sodium carbonate, heating the mixture to a temperature of from 1400° F. to 2400° F. until a clear green color is obtainable on cooling and washing, then cooling, washing out the soluble chromate formed and drying.

7. The process of producing chromic oxide pigments which comprises intimately mixing together anhydrous chromic acid and about 2% to 5% of sodium carbonate, heating to a temperature of 1900°–1950° F. for a period of 90 minutes or more, cooling, washing out the sodium chromate formed, and drying, thereby forming a pigment of dark green color.

8. The process of producing chromic oxide pigments which comprises intimately mixing together anhydrous chromic acid and a small percentage of a compound of an alkali metal which will react with chromic acid at least in part on heating to form a soluble chromate, heating the mixture to a temperature of from 1600° F. to 2200° F. for a period of at least about one hour, then cooling, washing out the soluble chromate formed and drying, thereby producing a clear dark green pigment.

9. The process of producing dark green chromic oxide pigments which comprises intimately mixing anhydrous chromic acid and from 2% to about 5% of a compound which will react with chromic acid at least in part on heating to form a soluble chromate, heating the mixture at a temperature of from 1600° F. to 2200° F. until a dark clear green color is obtainable on cooling and washing, then cooling, grinding, washing and drying, thereby producing a dark green chromic oxide pigment.

10. The process of producing dark green chromic oxide pigments which comprises intimately mixing anhydrous chromic acid and from 2% to about 5% of a compound which will react with chromic acid at least in part on heating to form a soluble chromate, heating the mixture at a temperature of 1900°–1950° F. for a period of at least about 90 minutes until the color purity of the oxide is satisfactorily increased, then cooling, grinding to reduce the aggregated masses and produce a uniform product, washing out the soluble chromate and drying.

11. The process of producing chromic oxide pigments which comprises intimately mixing together anhydrous chromic acid and a small percentage of soluble chromate and heating the mixture to a temperature between 1400° F. to 2400° F. until a clear green color is obtainable on cooling and washing, then cooling, washing out the soluble chromate and drying.

12. The process of producing chromic oxide pigments which comprises intimately mixing together anhydrous chromic acid and a small percentage of sodium chromate and heating the mixture at about 1950° F. until a clear green color is obtainable on cooling and washing, then cooling, washing out the sodium chromate and drying.

13. The process of producing chromic oxide pigments which comprises mixing together chromic acid and a small percentage of a compound which will react with chromic acid at least in part on heating to form a soluble chromate, heating the mixture to a temperature between 1400° F. to 2400° F. which forms the soluble chromate and reduces the acid to chromic oxide, continuing the heating until a clear green color is obtainable on cooling and washing, then cooling, washing out the soluble chromate formed and drying.

14. The process of producing chromic oxide pigments which comprises intimately mixing together chromic acid and a small percentage of a carbonate of a metal which will react with chromic acid at least in part on heating to form a soluble chromate, heating the mixture at a temperature of from 1400° F. to 2400° F. until a clear green color is obtainable on cooling and washing, then cooling, washing out the soluble chromate formed and drying.

15. The process of producing chromic oxide pigments which comprises intimately mixing together chromic acid and a small percentage of sodium carbonate but not less than about 2% of sodium carbonate, heating the mixture to a temperature of from 1400° F. to 2400° F. until a clear green color is obtainable on cooling and washing, then cooling, washing out the soluble chromate formed and drying.

16. The process of producing chromic oxide pigments which comprises intimately mixing together chromic acid and about 2% to 5% of sodium carbonate, heating to a temperature of 1900°–1950° F. for a period of 90 minutes or more, cooling, washing out the sodium chromate formed, and drying, thereby forming a pigment of dark green color.

17. The process of producing dark green chromic oxide pigments which comprises intimately mixing chromic acid and from 2% to about 5% of a compound which will react with chromic acid at least in part on heating to form a soluble chromate, heating the mixture at a temperature of from 1600° F. to 2200° F. until a dark clear green color is obtainable on cooling and washing, then cooling, grinding, washing and drying, thereby producing a dark green chromic oxide pigment.

18. The process of producing chromic oxide pigments which comprises intimately mixing together chromic acid and a small percentage of soluble chromate and heating the mixture to a temperature between 1400° F. to 2400° F. until a clear green color is obtainable on cooling and washing, then cooling, washing out the soluble chromate and drying.

JOSEPH W. AYERS.